United States Patent Office 2,916,482
Patented Dec. 8, 1959

2,916,482

METALLIZABLE AZO DYES PREPARED FROM SUBSTITUTED AMINOBENZOTHIAZOLES AND A β-NAPHTHOL

James M. Straley and John G. Fisher, Kingsport, Tenn., assignors to Eastman Kodak Company, Rochester, N.Y., a corporation of New Jersey No Drawing. Application April 15, 1957
Serial No. 652,687

8 Claims. (Cl. 260—146)

This invention relates to certain metallized azo dyes prepared from novel intermediates and novel nonmetallized azo dyes.

The dyes of this invention are metallized complexes of azo dyes having the structural formula:

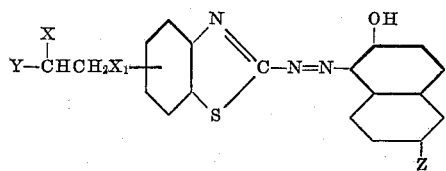

wherein $X_1$ is selected from the group consisting of S and $SO_2$, X is selected from the group consisting of hydrogen and methyl, Y is selected from the group consisting of —$CH_2CN$, —COOH, —COOR, —$CONH_2$, —CONHR, $CONR_2$ and —CN and Z is selected from the group consisting of hydrogen, halogen and

In the above definition, R is a lower alkyl radical containing from 1 to 4 carbon atoms.

The non-metallized dyes that are employed in preparing the dyes of this invention are prepared by diazotizing an amine having the structural formula:

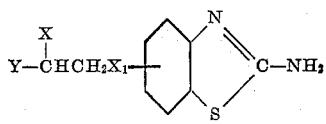

The resulting diazo compound is then reacted or coupled with β-naphthol or a derivative of β-naphthol having the formula:

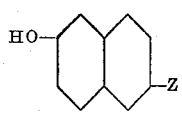

In the above formulas for the amino compound to be diazotized and the β-naphthol or derivative of β-naphthol, $X_1$, X, Y and Z are as defined in the formula set forth above for the dyes of this invention. One method of carrying out the diazotization reaction involves dissolving the amino compound in an aqueous hydrochloric acid solution and then adding sodium nitrite. The details of the diazotization reaction are set forth in the specific examples and the procedures described in those examples represent methods by which the diazotization reaction can be carried out.

The aminobenzothiazole intermediates that are used in the preparation of the metallized dyes of this invention can be produced by the procedures described in the following examples:

Example 1.—Preparation of 2-amino-6-γ-cyanopropylthiobenzothiazole 100 g. (0.484 m.) of 2-amino-6-thiocyanobenzothiazole, 116 g. $Na_2S \cdot 9H_2O$ and 800 g. of water were refluxed 10 minutes. The heating source was removed and 50 g. of γ-chlorobutyronitrile were added dropwise at such a rate as to continue refluxing. After complete addition, the mixture was refluxed 1 hour and cooled to room temperature with stirring. The crystals were filtered off, washed with water, and dried at 60°. The yield was 117.5 g. (98% of theory) of 2-amino-6-γ-cyanopropylthiobenzothiazole, melting at 105–7° C.

Example 2.—Preparation of 2-amino-6-γ-cyanopropylsulfonylbenzothiazole 29.8 g. (0.2 m.) of the product of Example 1 were suspended in 125 cc. of acetic acid and 46 cc. (0.44 m.) 30% $H_2O_2$ were added with stirring. After about three-fourths of the $H_2O_2$ was added, the temperature rose to about 90° C. The mix was cooled to 70° C. and the remainder added. After addition, the mix was heated on a steam bath for 1 hour and allowed to stand at room temperature until crystallization was complete. The solid was filtered off, washed with cold acetic acid, water, and dried at 60° C. The yield was 34 g. of 2-amino-6-γ-cyanopropylsulfonylbenzothiazole melting at 157–159° C.

Example 3.—Preparation of 2-amino-6-β-cyanoethylmercaptobenzothiazole 26.2 g. (0.121 m.) of 95.7% 2-amino-6-thiocyanobenzothiazole, 29 g. (0.121 m.) of $Na_2S \cdot 9H_2O$ and 250 cc. of water were stirred at reflux for about 30 minutes. The heat source was removed and 6.5 g. (0.121 m.) of acrylonitrile were added dropwise in about 20 minutes. The mix was then stirred for about 1 hour, the temperature falling to 37° C. The product was filtered off, washed with water and dried at 100° C. The yield was 27.2 g. (95.5% of theory), melting at 163.5–167° C.

Example 4.—Preparation of 2-amino-6-[β-(N,N-dimethylcarbamoyl)-ethylmercapto]-benzothiazole 52.3 g. (0.242 m.) of 95.7% 2-amino-6-thiocyanobenzothiazole, 58 g. (0.242 m.) of $Na_2S \cdot 9H_2O$, and 500 cc. of water were stirred at reflux for 30 minutes. To the refluxing solution were added 25.2 g. (0.242 m.) of 94% N,N-dimethylacrylamide in about 5 minutes. Reflux was continued for 30 minutes and then allowed to cool to room temperature with stirring. The product was filtered off, washed with water and dried. The yield was 54 g. melting at 159.'–160° C., having the following structure:

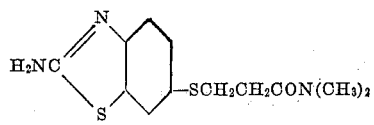

The products in the following table can be prepared according to the processes of the above examples:

| Acrylic Derivative Used | 6-Substituent Resulting | Melting Point, °C. | Yield, Percent |
|---|---|---|---|
| $CH_2=CHCONHCH(CH_3)_2$ | $-SCH_2CH_2CONHCH(CH_3)_2$ | 125-127 | 77 |
| $CH_2=CCN$<br>$\quad\|$<br>$\quad CH_3$ | $-SCH_2CHCN$<br>$\qquad\|$<br>$\qquad CH_3$ | 101-103 | 73 |
| $CH_2=CCON(CH_3)_2$<br>$\quad\|$<br>$\quad CH_3$ | $-SCH_2CHCON(CH_3)_2$<br>$\qquad\|$<br>$\qquad CH_3$ | 234-236 | 80 |
| $CH_2=CHCO_2CH_3$ | $-SCH_2CH_2CO_2CH_3$ | 239-240 | 99 |
| $CH_2=CHCOOH$ | $-SCH_2CH_2CO_2H$ | 231-233 | 79 |
| $CH_2=CHCONH_2$ | $-SCH_2CH_2CONH_2$ | 187-188 | 83 |

Example 5

25.3 g. (0.1 m.) of 2-amino-6-carbamoylethylthiobenzothiazole were dissolved in 60 cc. of acetic acid. 23 cc. of 30% $H_2O_2$ were added at such rate that the temperature did not exceed 60° C. After addition, the mix was stirred 1 hour on the steam bath and allowed to cool to room temperature. The solid was filtered off and brought to a boil in 400 cc. of 5% HCl and filtered. The filtrate was cooled and neutralized to Congo with sodium acetate. The product was filtered off, washed with water, and dried. The material thus obtained melts at 240-245° C., and has the following structure:

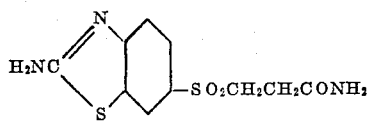

Example 6

10 g. (0.04 mole) of 2-amino-6-β-cyanopropylthiobenzothiazole were dissolved in 13 cc. acetic acid. This solution was added at 15-25° C. to 10 cc. of 30% $H_2O_2$. The mix was removed from the cooling bath, the temperature rising to about 50° C. The mix was allowed to stand for 72 hours and the solid formed was separated by filtering, washing with water, and drying. The product melts at 186-188° C. and has the following structure:

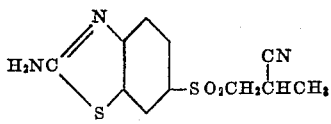

Example 7

20 g. (0.0712 m.) of 2-amino - 6 - N,N,-dimethylcarbamoylethylthiobenzothiazole were dissolved in 48 cc. of acetic acid. 16.5 cc. of 30% $H_2O_2$ were added at such a rate that the temperature did not exceed 70° C. After addition, the mixture was stirred 1 hour on the steam bath and allowed to cool. The material which separated was filtered off, washed well with water and dried. The product melts at 237-238° C. and has the following structure:

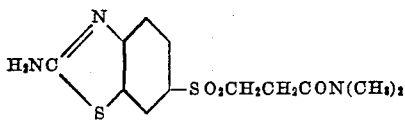

The aminobenzothiazole intermediates are coupled with β-naphthol or a derivative of β-naphthol to form non-metallized dyes within the scope of this invention. The non-metallized dyes, after their preparation, are reacted with a metal salt, such as suitable salts of nickel, cobalt, copper, chromium, manganese, iron or vanadium. The non-metallized azo compounds can be metallized either on or off the materials they color. Metallization can be carried out, for example, by treating the non-metallized azo compound with a solution or dispersion of the metallizing agent. Although the metal complex is often formed at room temperature, we prefer to accelerate the process by heating, usually with steam, for a short period of time. The metallization is effected by procedures well known to those skilled in the art to which this invention is directed.

Illustrative of the metallizing agents that can be employed are halides, the sulfates, the acetates, the cyanides and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate [Ni(SCN)$_2$], cobaltous bromide, cobaltic chloride, cobaltous chloride, cobaltous acetate, cobaltous cyanide, cobalt thiocyanate [Co(SCN)$_2$], cupric chloride, cupric bromide, cupric acetate, cupric lactate, chromium trichloride, chromium tribromide, chromic sulfate, chromic acetate, chromium thiocyanate [Cr(SCN)$_3$], manganese chloride, manganous sulfate, manganese acetate, manganese thiocyanate [Mn(SCN)$_2$], ferric chloride, ferric fluoride, ferrous acetate, ferrous thiocyanate [Fe(SCN)$_2$], ferric thiocyanate [Fe(SCN)$_3$], and vanadium thiocyanate [V(SCN)$_2$] are illustrative of the metallizing agents that can be employed.

The non-metallized monoazo compounds described herein are useful for the dyeing of cellulose alkyl carboxylic acid esters having 2 to 4 carbon atoms in the acid groups thereof, nylon, sulfone polyesters, polyethylene terephthalate and polyacrylonitrile. After application to these materials, usually in the form of textile materials, the dye is metallized thereon. The metallized azo compounds of our invention can be applied by ordinary dyeing or printing techniques to nitrogenous textile materials such as wool, silk, nylon and acrylonitrile polymers, for example. Coloration can also be effected by incorporating the non-metallized or metallized azo compounds into the spinning dope, spinning the fiber as usual and converting the non-metallized azo compounds to their metallized form. Also the metallizing agent can be incorporated in the spinning dope, the fiber spun as usual and then dyed with the non-metallized monoazo compounds to form the metal complex on the fiber. The new metallized dyes of our invention are preferably formed by heating the non-metallized azo dye with the metallizing agent in organic solvents such as, for example, cellulose acetate, cellulose acetate-propionate, acrylonitrile polymers, polyamides, methyl cellosolve and formamide.

As is well known, one of the disadvantages dyed cellulose acetate textile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention dyed cellulose acetate textile materials having good-to-excellent fastness to washing, light and gas are obtainable. These results may be obtained by dyeing the cellulose acetate textile material with the non-metallized azo compounds and then treating the dyed cellulose acetate textile material with suitable metal salts which cause the original dye to form metallic complexes which are resistant, for example, to the action of washing, light and gas. These results can also be obtained by incorporating the metallized azo dye into the cellulose acetate spinning dope and spinning the fiber as usual. Thus, by means of the present invention, the disadvantage noted above with respect to the wash fastness of dyed cellulose acetate textile materials is either entirely or largely overcome. Cellulose acetate has been particularly referred to because it is the most widely used cellulose alkyl carboxylic acid ester.

When the metal complex is formed on a cellulose alkyl carboxylic acid ester, such as cellulose acetate fiber, the use of a metal thiocyanate appears to be advantageous and is preferred. Nickel thiocyanate appears to be especially useful and particular claim is laid to its use. Next to nickel thiocyanate the use of cobalt thiocyanate is preferred.

Metallization will be described in detail with reference to nickel and cobalt inasmuch as the metallized dyes containing these materials in complex combination appear to be advantageous. However, it will be clearly understood that the non-metallized azo compounds can be metallized with the other metals disclosed herein. The azo compounds disclosed herein have varying utility as dyes. The degree of utility varies, for example, depending upon the material being colored and the actual dye employed.

*Example 8*

14.05 g. (.05 mole) of 2-amino-6-β-cyanopropylsulfonylbenzothiazole were dissolved in 120 ml. of $H_2O$ and 70 ml. of $H_2SO_4$ below 50° C. The solution was cooled to 3° C. and a solution of 3.8 g. of $NaNO_2$ in 25 ml. of $H_2SO_4$ was added below 5° C. The diazo solution was stirred for 2 hours at 3 to 5° C. and then added to 11.15 g. (.05 mole) of 6-bromo-2-naphthol dissolved in 500 ml. of $H_2O$ containing 2 g. of NaOH. The coupling solution was kept below 5° C. during the addition of the diazo solution by addition of ice. The coupling mixture was then stirred for 2 hours without further cooling and then diluted to 2 l. by addition of water. The dye was isolated by filtering, washing with water and air drying. The yield was 20.1 g. of material which dyes cellulose acetate in orange shades. When the dyed cellulose acetate was treated with nickel thiocyanate, blue shades were obtained which had excellent fastness properties. Cobalt produces somewhat redder and duller shades which have the same fastness properties.

The dyes in the following examples were prepared in exactly the same manner as described in Example 8.

| Example | 6-Substituted-2-Amino Benzothiazole | 6-Substituted-2-Naphthol | Color on Cellulose Acetate | |
|---|---|---|---|---|
| | | | Original | Complexed |
| 9 | β-Cyanopropyl-sulfonyl | Acetyl | Orange | Ni blue. / Co violet. |
| 10 | do | Unsubstituted | do | Ni violet. / Co violet. |
| 11 | β-Carbomethoxyethyl-sulfonyl | do | do | Ni violet. / Co violet. |
| 12 | do | Bromo | do | Ni blue. / Co violet. |
| 13 | β-Cyanoethyl-sulfonyl | Acetyl | do | Ni violet. / Co violet. |
| 14 | do | Bromo | do | Ni blue. / Co violet. |
| 15 | do | Unsubstituted | Yellow | Ni violet. / Co violet. |
| 16 | β-Carbamoyl-ethylsulfonyl | do | Red | Ni bluish-grey. / Co grey. |
| 17 | β-(N,N-dimethyl-carbamoyl)-ethylsulfonyl | do | Orange | Ni violet. / Co violet. |
| 18 | do | Acetyl | do | Ni blue. / Co violet. |
| 19 | do | Bromo | do | Ni blue. / Co violet. |
| 20 | β-(N-isopropyl-carbamoyl)-ethylsulfonyl | Unsubstituted | do | Ni violet. / Co violet. |
| 21 | do | Bromo | do | Ni blue. / Co violet. |
| 22 | do | Acetyl | do | Ni violet. / Co violet. |

*Example 23*

12.45 g. (.05 mole) of 2-amino-6-β-cyanopropylthiobenzothiazole were dissolved in 120 ml. of $H_2O$ and 70 ml. of $H_2SO_4$ below 50° C. The solution was cooled to 3° C. and a solution of 3.8 g. of $NaNO_2$ in 25 ml. of $H_2SO_4$ was added below 5° C. The diazo solution was stirred 2 hours at 3 to 5° C. and then added to a solution of 7.2 g. (.05 mole) of β-naphthol in 500 ml. of $H_2O$ containing 2 g. of NaOH at 5° C. The coupling mixture was stirred 2 hours without further cooling and then 1.5 l. of $H_2O$ was added. The dye was isolated by filtering, washing with water, and air drying. The yield was 15 g. of material which dyed cellulose acetate in reddish-orange shades which are transformed by treatment with nickel thiocyanate to fast blue shades. Cobalt produces reddish-blue shades which are somewhat duller.

The dyes listed in the following examples were prepared in exactly the same way as described in Example 23.

| Example | 6-Substituted-2-Amino Benzothiazole | 6-Substituted-2-Naphthol | Color on Cellulose Acetate | |
|---|---|---|---|---|
| | | | Original | Metallized |
| 24 | β-Cyanopropyl-thio | Bromo | Red | Ni blue. / Co violet. |
| 25 | β-Carbomethoxy-ethylthio | do | do | Ni blue. / Co violet. |
| 26 | do | Unsubstituted | do | Ni blue. / Co violet. |
| 27 | β-(N-isopropyl-carbamoyl)-ethylthio | Acetyl | do | Ni blue. / Co violet. |
| 28 | do | Unsubstituted | do | Ni blue. / Co bluish-grey. |
| 29 | do | Bromo | do | Ni blue. / Co bluish-grey. |
| 30 | β-Carbamoyl-ethylthio | Acetyl | do | Ni blue. / Co violet. |
| 31 | do | Bromo | do | Ni blue. / Co violet. |
| 32 | do | Unsubstituted | do | Ni blue. / Co bluish-grey. |
| 33 | β-Cyanoethylthio | Acetyl | do | Ni blue. / Co violet. |
| 34 | do | Bromo | do | Ni blue. / Co bluish-grey. |
| 35 | do | Unsubstituted | do | Ni blue. / Co violet. |
| 36 | β-(N,N-dimethyl-carbamoyl)-ethylthio | Acetyl | do | Ni blue. / Co violet. |
| 37 | do | Unsubstituted | do | Ni blue. / Co bluish-grey. |
| 38 | do | Bromo | do | Ni blue. / Co bluish-grey. |
| 39 | β-(N,N-dimethyl-carbamoyl)-propylthio | Unsubstituted | do | Ni blue. / Co bluish-grey. |
| 40 | β-Carboxyethyl-thio | Bromo | do | Ni blue. / Co bluish-grey. |
| 41 | do | Acetyl | do | Ni blue. / Co violet. |
| 42 | do | Unsubstituted | do | Ni blue. / Co violet. |

Example 43

12.45 g. (0.05 mole) of 2-amino-6-γ-cyanopropylthio-benzothiazole were dissolved in 120 ml. of $H_2O$ and 70 ml. of $H_2SO_4$ below 50° C. The solution was cooled rapidly to 3° C. and a solution of 3.8 g. of $NaNO_2$ in 25 ml. of $H_2SO_4$ was added below 5° C. After addition the diazo solution was stirred 2 hours at 3 to 5° C. and then added to a solution of 9.3 g. of 6-acetyl-2-naphthol in 400 ml. of $H_2O$ containing 10 g. of NaOH cooled by addition of ice. The coupling mixture was stirred 2 hours without further cooling and then diluted to 2 l. by the addition of water. The dye was isolated by filtering, washing with water, and drying. The yield was 15.2 g. of material which dyed cellulose acetate in red shades. When the dyeings are treated with nickel thiocyanate, bright reddish-blue shades with good fastness properties are obtained. Cobalt produces duller shades.

The dyes which appear in the following examples were prepared as described in Example 43.

It is known in the art that a 2-aminobenzothiazole can be coupled with β-naphthol to produce a dye and it is also known in the art that 2-amino-5-alkylsulfonyl-benzothiazoles can be produced. However, the dyes within the scope of this invention are unexpectedly superior in tinctorial power and light-fastness properties to the prior art dyes and also to the dyes prepared from the prior art intermediates.

We claim:

1. As a composition of matter, the azo compounds selected from the group consisting of azo compounds and their metal complexes containing a metal selected from the group consisting of chromium, cobalt, copper, iron, manganese, nickel and vanadium, said azo compounds having the structural formula:

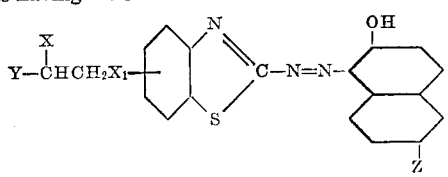

wherein $X_1$ is selected from the group consisting of S and $SO_2$, X is selected from the group consisting of hydrogen and methyl, Y is selected from the group consisting of —$CH_2CN$, —COOH, —COOR, —$CONH_2$, —CONHR, —$CONR_2$ and —CN, Z is selected from the group consisting of hydrogen, halogen and

and R is a lower alkyl radical containing from 1 to 4 carbon atoms.

| Example | 2-Amino 6-Substituted-Benzothiazole | 6-Substituted-2-Naphthol | Color on Cellulose Acetate | |
|---|---|---|---|---|
| | | | Original | Metallized |
| 44 | γ-Cyanopropyl-thio | Unsubstituted | Red | Ni blue. / Co bluish-grey. |
| 45 | do | 6-bromo | do | Ni blue. / Co bluish-grey. |
| 46 | γ-Cyanopropyl-sulfonyl | do | Orange | Ni blue. / Co violet. |
| 47 | do | 6-acetyl | do | Ni blue. / Co violet. |
| 48 | do | Unsubstituted | do | Ni reddish-blue. / Co violet. |

2. As a composition of matter, the azo compounds having the structural formula:

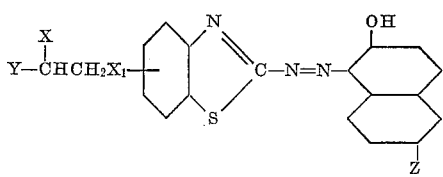

wherein $X_1$ is selected from the group consisting of S and $SO_2$, X is selected from the group consisting of hydrogen and methyl, Y is selected from the group consisting of —$CH_2CN$, —COOH, —COOR, —$CONH_2$, —CONHR, —$CONR_2$ and CN, Z is selected from the group consisting of hydrogen, halogen and

and R is a lower alkyl radical containing from 1 to 4 carbon atoms.

3. As a composition of matter, a complex metal compound containing a metal selected from the group consisting of chromium, cobalt, copper, iron, manganese, nickel and vanadium in complex combination with the monoazo compounds having the formula set forth in claim 2.

4. As a composition of matter, the benzothiazole azo compound having the structural formula:

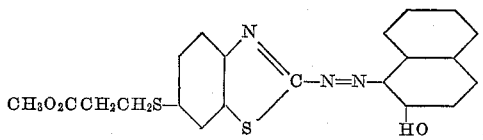

5. As a composition of matter, the benzothiazole azo compound having the structural formula:

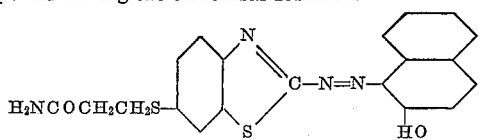

6. As a composition of matter, the benzothiazole azo compound having the structural formula:

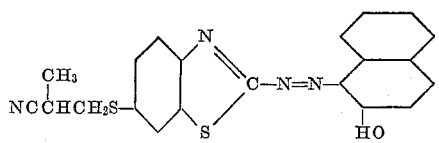

7. As a composition of matter, the benzothiazole azo compound having the structural formula:

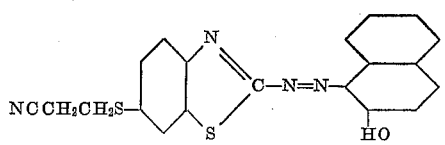

8. As a composition of matter, the benzothiazole azo compound having the structural formula:

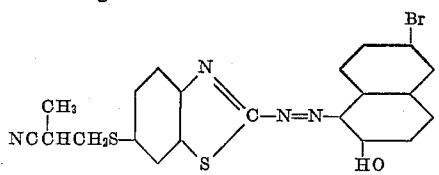

References Cited in the file of this patent
UNITED STATES PATENTS

| | | |
|---|---|---|
| 2,003,444 | Herz et al. | June 4, 1935 |
| 2,019,529 | Engelmann | Nov. 5, 1935 |
| 2,686,176 | Gunst | Aug. 10, 1954 |
| 2,686,177 | Gunst | Aug. 10, 1954 |